United States Patent Office

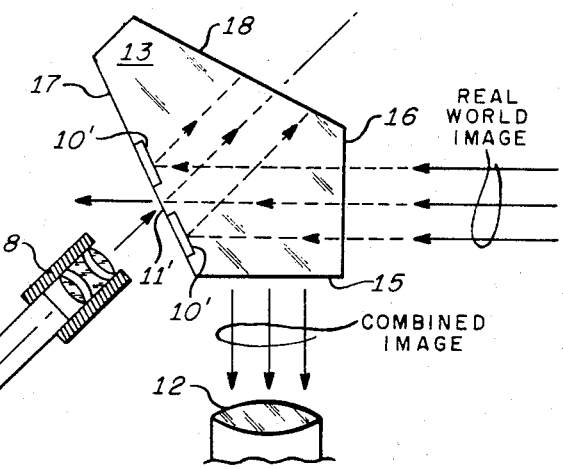
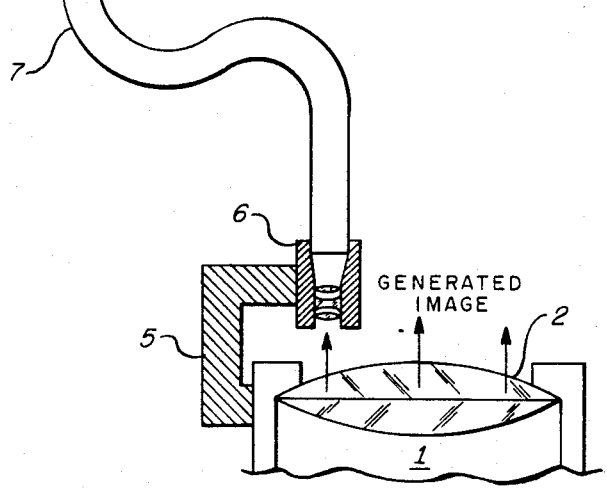
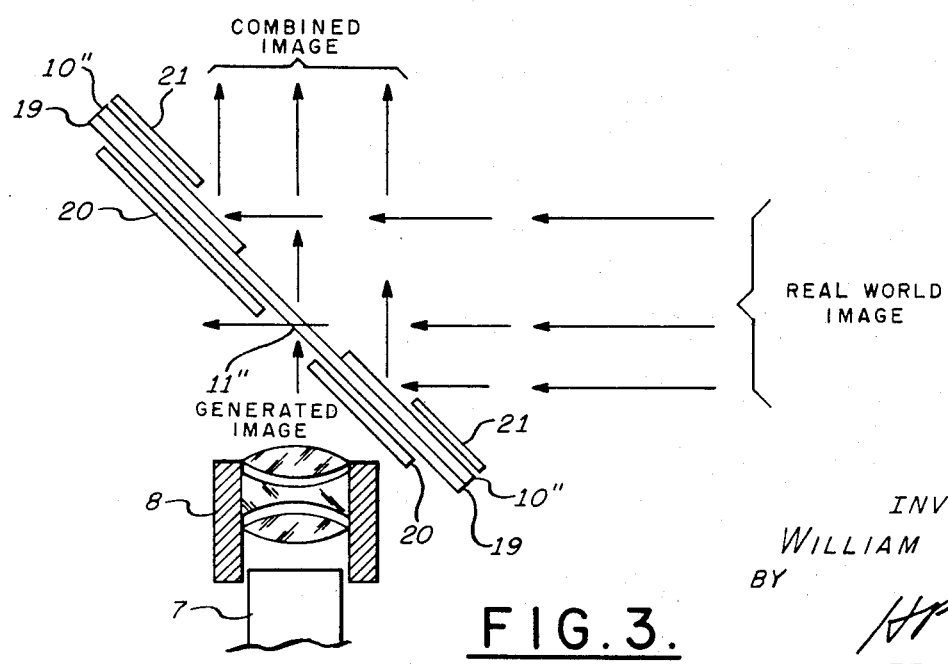
FIG.2.
FIG.3.
INVENTOR
WILLIAM J. LUCAS

3,666,346
Patented May 30, 1972

3,666,346
HEADSUP DISPLAY WITH REMOTE RECORDER
William J. Lucas, Phoenix, Ariz., assignor to
Sperry Rand Corporation
Filed Sept. 28, 1970, Ser. No. 76,114
Int. Cl. G02b 23/10, 27/10
U.S. Cl. 350—19
5 Claims

ABSTRACT OF THE DISCLOSURE

An electrically generated image is collimated, and, by means of a fiber optic bundle, transmitted to a combining means. A real world image, which is assumed to be collimated, is also presented to the combining means. The combining means comprises an apertured mirror whereby the two images are combined by reflecting and transmitting apertures. The combined image may be recorded directly on film at an immediate or at a remote location.

BACKGROUND OF THE INVENTION

(1) Field of the invention

The invention is directed toward apparatus for combining two or more images suitable for photographic or other recording means.

(2) Description of the prior art

Known devices for producing a combined image from two or more sources have used the phenomenon of division of wavefronts at partially reflecting surfaces. In situations where one of the images had to be routed to a location remote from the image source, cumbersome and delicately aligned periscopes were used.

SUMMARY OF THE INVENTION

The present invention provides apparatus or optical system for combining two or more images and presenting to an image recording system, such as a camera, a composite image. Generally, one of the images is a real world image and therefore usually collimated, and received directly by combining means and a second image is an artificially generated image that must be collimated by appropriate optical lenses and conveyed to the combining means. A fiber optic bundle is admirably suited for conveying this image due to the ease of routing without affecting the efficiency of the image transmission capability. A part reflecting and part transmitting aperture system is used to perform the combining operation. The ratio of reflection area of the real world image to transmission area of the generated image determines the luminous flux associated with each image and by appropriate ratio selection, the resulting image will appear to be a single non-composite image. A suitable lens system may be used to route the composite image for recording in a light-sensitive apparatus such as a camera.

A primary object of the invention is to provide a permanently recordable composite image comprising an artificially generated image superimposed on a real world image.

Another object of the invention is to provide a means for photographing a pilots line of sight defined by a collimated recticule relative to his target.

Another object of the invention is to provide a means for duplicating a head up display without deleteriously affecting the pilot's field of view.

Another object of the invention is to provide a means whereby the recording means may be remotely located.

Another object of the invention is to provide a generated image transmission path that is insensitive to vibration.

BRIEF DESCRIPTION OF THE DRAWINGS

FIG. 2 illustrates a head up display unit with remotely located penta prism means for combining a generated image with a real world image.

FIG. 3 illustrates a means for varying the area of a generated image and a real world image at the combining means shown in FIGS. 1 and 2.

DESCRIPTION OF THE PREFERRED EMBODIMENT

Figure 1:
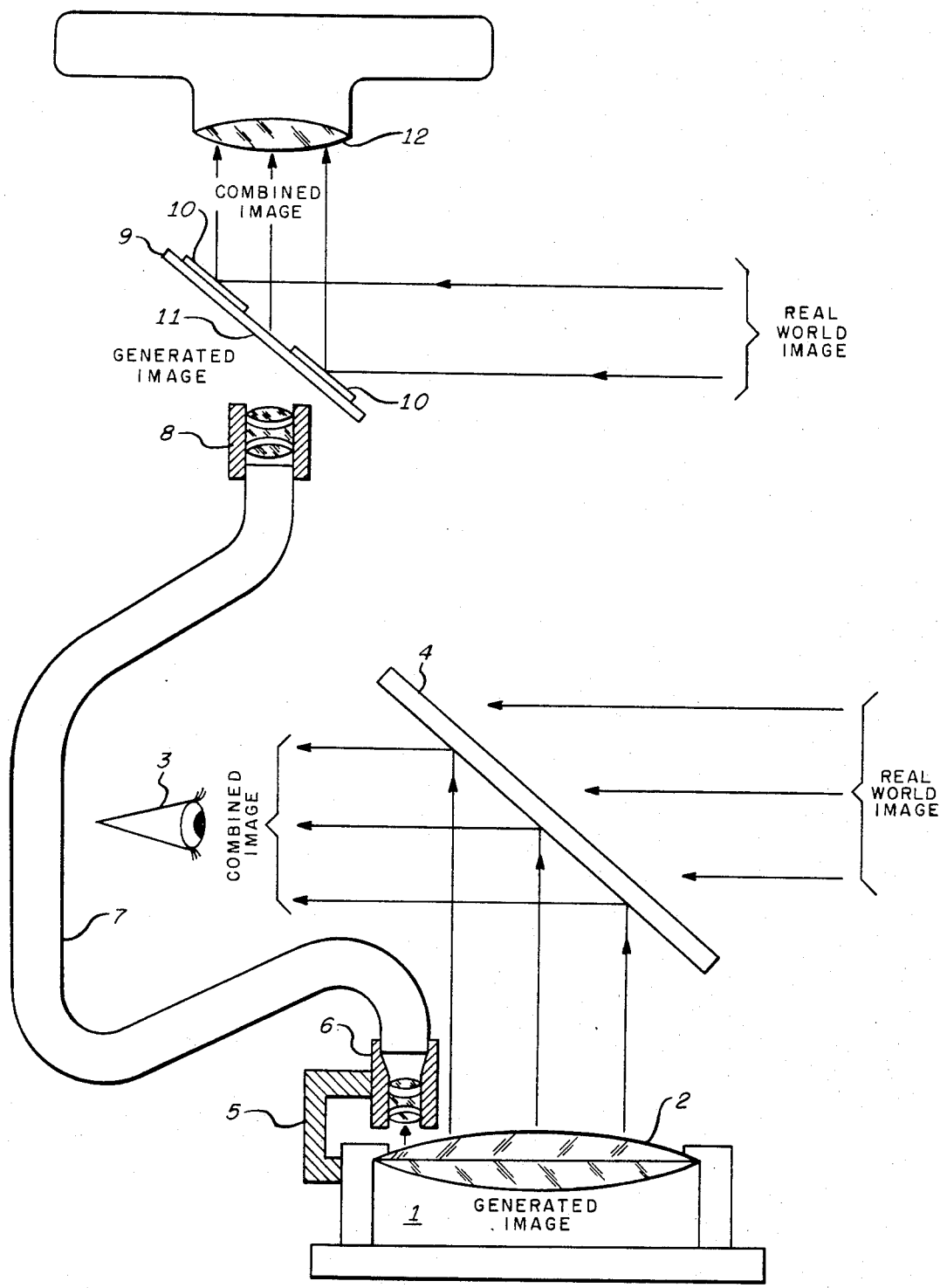
FIG. 1 illustrates a head up display unit with remotely located combining means for combining a generated image with a real world image.

In most military aircraft designed to have a manual capability while firing or releasing their armament, the pilot attempts to line up a sight reticule on the target. On alignment, the armament firing or release mechanism is activated and the armament will be on-target resulting in a "hit." In older aircraft a mechanical reticule extended into the pilot's line of sight and alignment of the reticule with the target indicated an on-target situation.

The succeeding generation of sighting means provides an image representative of the reticule positioned in the pilot's line of sight. The image could be generated by any appropriately masked light source, or in most recent devices, a cathode ray tube (CRT). The image is collimated and projected onto an angled transparent and partially reflective glass plate, or combining glass, interposed between the pilot and his forward field of view. At the combining glass, the generated symbology is superimposed on the real world image by the phenomenon of division of wavefronts at a partially reflecting surface and the pilot sees the composite image. Because of the nature of the collimated image (it is assumed that the real world image is also collimated) the symbology will not appear to dance even though the pilot's viewing point may shift. This type of system is generally referred to as a Head Up Display (HUD), as distinguished from a display system requiring the pilot to look away from the real world and read instruments. In addition to providing a sighting image, the HUD unit may, by use of CRT generated symbols, display flight director cues, range, altitude, fuel, etc. information.

A prevailing military requirement is that of obtaining a record of the pilot's accuracy in sighting his target. An obvious solution is to place a camera in the pilot's line of sight and photograph what he sees. This obstructs the pilot's vision and is undesirable. Other prior art systems used a periscope for viewing the generated symbology and the real world. The periscopes were folded by mirrors or prisms. Some reduction in obstructing the pilot's field of view may have been accomplished but other problems developed. The periscope had to be of relatively large size, required a high degree of rigidity to maintain proper alignment and massive support means at the HUD to withstand the stresses imposed. A practical factor of loss of image intensity dictated the maximum length for any given cross-sectional area. The limited available length dictated to a great degree the placement of the camera.

FIG. 1 represents the basic apparatus for utilizing the invention. The generated image is produced in the HUD unit 1 and appears as a collimated image through lens 2 and projected to glass plate 4. To the pilot's eye 3, the image appears on plate 4. The pilot also sees the real world through plate 4 and the image appears superimposed on the real world. The combined image has been found satisfactory in respect to information content and display clarity if the ratio of the luminous flux of the real to that of the generated image is three to one. Attached to unit 1 by means of a support 5 is a lens system 6 for introducing the collimated image to the fiber optic bundle 7. The fiber optic bundle 7 is used to route the generated image to the apertured mirror 9. The mirror 9 is constructed such that its center portion 11, in the nature of an aperture, is not silvered. The other end of the fiber optics bundle 7 also contains appropriate collimating optics 8 of a predetermined cross-sectional area. The angular orientation of the mirror 9 in the preferred embodiment is at 45° to the line of sight of the pilot. Thus, the real world image will be received parallel to the pilot's line of sight and be reflected by the silvered portion 10 of mirror 9 surrounding aperture 11 in a vertically upward direction. The lens system 8 is oriented such that the image projected through the non-silvered aperture 11 will also be in the vertically upward direction. The sizes of the silvered area 10 and the aperture 11 should be such that the ratio of the luminous flux from the real world image to the luminous flux from the generated image will give the proper contrast in the combined image. Nominally, it may be three to one to match and duplicate the combined image seen by the pilot. The combined image may be directly collected by a camera lens 12, or it may, by use of mirrors or prisms, be directed to a remotely located camera.

FIG. 2 illustrates a modification incorporating the invention. The generated image is picked up from HUD unit 1 through collimating lens 2 by the lens system 6 and transmitted by the fiber optic bundle 7 to lens system 8. The lens system 8 is operably connected to face 17 of the penta prism 13. Face 17 comprises silvered area 10' and transmitting area 11'. The silvered area 10' forms the reflecting surface for the real world while transmitting area 11' forms the aperture for the generated image. The areas of the respective reflecting surface and aperture provide the desired ratio of luminous flux fom the real world to the luminous flux from the generated image to provide the desired contrast in the combined image. The generated image is introduced to the penta prism 13 through aperture 11' and by well known prism characteristics is reflected by surface 18 within the prism and emerges through face 15. The real world image is introduced to the prism through face 16 and is reflected by the inside reflecting surface of face 17. Ultimately, the combined image is reflected by surface 18 and emerges from the prism through face 15. A camera lens 12 positioned adjacent to face 15 may be used to record the combined image.

In a further modification, the apertures of the combining means shown in FIGS. 1 and 2 may be made variable. FIG. 3 illustrates the apparatus that may be substituted in FIG. 1 or may be used in combination with mirrors and receiving means mounted in a penta prismlike relationship to duplicate the system of FIG. 2. In FIG. 3, the surface 19 corresponds in function to surface 9 or 17 of FIG. 1 or 2 in having a silvered area 10" and a transmitting area 11". A first variable aperture 20 is mounted adjacent to the non-silvered surface 11" and controls the amount of transmitted luminous flux from the generated image. A second variable aperture 21 is mounted adjacent the silvered surface 10" and controls the amount of exposed silvered surface. Hence, it controls the amount of reflected luminous flux from the real world image. The two apertures may be used to provide a combined image having a wide range of selected image area ratios.

The illumination control for the individual images prior to combining them or of the combined image may be either fixed or variable. The exact nature of the control is not limited by the invention and the choice is dependent upon the requirements of any particular application. An exemplary listing of possible illumination controls would include cross polarization, variable iris diaphragms, variable neutral density filters, tilting vane diaphragms and the shutter speed of the image recording device.

An advantage of each of the above devices incorporating the invention is that the recording means need not be rigidly mounted in respect to the HUD display. The image transmitting means, fiber optic bundle, may be routed so as not to interfere with the pilot's field of view or his other normal cockpit functions. The real world image receiving means may be mounted at any point in the cockpit to minimize interference with the pilot's activities. The only requirement placed upon its location is that the real world image is received on a path parallel to that of the real world image for the HUD unit. As discussed, the camera or recording means may be mounted attached to the combiner means or the combined image may be routed to a remotely located camera.

There are several additional methods whereby the combined image may be introduced to the recording means. The camera lens itself may be the recipient of the real world image and the fiber optic bundle, including an appropriate lens system, may present a second input to the camera lens. The ratio of image flux is controlled by the relative camera lens area occupied by each image input and the combined image is focused on the camera film and recorded. A modification of the above system may be to employ an imaging lens for each image input, each image lens being focused on the same portion of film. In a further modification both the real world image asd the generated image could be routed by fiber optic bundles to a remote location. By using a finite congregate lens system for each bundle the image could be focused on the same film portion and thereby effect the combined image. In a further modification a deviating prism could be placed in the path of each of the above-mentioned fiber optic bundle outputs so that their virtual images would appear to coincide in the same plane. The two fields may then be imaged by a single imaging lens and the combined image focused on film.

While the invention has been described in its preferred embodiment, it is to be understood that the words which have been used are words of description rather than limitation and that changes within the purview of the appended claims may be made without departing from the true scope and spirit of the invention in its broader aspects.

I claim:
1. An aircraft headup display system comprising
recorder means,
first optical beam combiner means through which the pilot views a scene outside the aircraft,
second optical beam combiner means remotely disposed from said first combiner means to preclude obscuration of the pilot's normal field of view therethrough and oriented to direct to the recorder means collimated light received from the outside scene along a path substantiallly parallel to the pilot's line of sight to the scene,
means for generating visual data to be presented to both the pilot and the recorder means,
first lens means cooperable with the visual data generating means for transmitting to said first combiner means a collimated image of the generated visual data to be directed to the pilot for simultaneous viewing with the outside scene,
second comparatively smaller lens means positioned adjacent the periphery of said first lens means for receiving a small portion of light of the collimated image of the generated visual data transmitted by said first lens means.
third lens means positioned adjacent said second optical beam combiner means,
optical fiber means coupling said second and third lens means for transmitting a collimated image of the generated visual data to said second combiner means to be directed to said recorder means simultaneously with the light received from the outside scene.
2. The apparatus of claim 1 wherein the second optical beam combiner means includes means for controlling the relative intensities of the generated visual data and the light received from the outside scene.

3. The apparatus of claim 1 wherein the first and second beam combiners comprise respective first and second planar beamsplitters.

4. The apparatus of claim 3 wherein the second beam combiner means further includes a diaphragm adjacent one side of the beamsplitter for controlling the intensity of the light from the outside scene relative to the intensity of the generated visual data image.

5. The apparatus of claim 3 wherein the second beam combiner further includes a pair of variable aperture diaphragms each positioned adjacent opposite sides of the beamsplitter for independently controlling the intensity of the generated visual data image and the light received from the outside scene.

References Cited

UNITED STATES PATENTS

| | | | |
|---|---|---|---|
| 3,446,916 | 5/1969 | Abel et al. | 350—174 |
| 3,495,517 | 2/1970 | Sweet | 350—96 B |
| 2,821,105 | 1/1958 | Walker | 350—174 |
| 3,284,566 | 11/1966 | James et al. | 350—172 |

JOHN K. CORBIN, Primary Examiner

R. J. STERN, Assistant Examiner

U.S. Cl. X.R.

350—96 B, 169, 174